(No Model.)

E. T. COVELL.
FASTENING FOR HORSESHOES.

No. 490,270. Patented Jan. 24, 1893.

Witnesses
Jas. J. Maloney
M. E. Hill

Inventor
Edward T. Covell,
by Jos. P. Livermore
Att'y

THE NORRIS PETERS CO., PHOTO-LITHO., WASHINGTON, D. C.

UNITED STATES PATENT OFFICE.

EDWARD T. COVELL, OF NEW BEDFORD, MASSACHUSETTS.

FASTENING FOR HORSESHOES.

SPECIFICATION forming part of Letters Patent No. 490,270, dated January 24, 1893.

Application filed June 20, 1892. Serial No. 437,322. (No model.)

*To all whom it may concern:*

Be it known that I, EDWARD T. COVELL, of New Bedford, county of Bristol, State of Massachusetts, have invented an Improvement in Fastenings for Horseshoes, of which the following description, in connection with the accompanying drawings, is a specification, like letters on the drawings representing like parts.

My invention relates to a fastening for horse shoes by which the shoe is securely fastened to the hoof without the employment of nails.

In another application Serial No. 415,089, filed December 15, 1891, I have shown a fastening consisting of a band or bail that engages with the shoe at the side of the hoof and passes substantially vertically over the front inclined portion of the hoof and is acted upon by a straining device engaging with the fore part of the hoof and with the said band.

In the fastening forming the subject of the present invention the shoe and fastening band may be substantially the same as in my said former application, and the present invention relates mainly to the construction of the straining device in combination with a shoe and fastening band of the kind specified. The straining device employed in connection with this invention comprises a block or base piece adapted to rest against the inclined fore part of the hoof in a position extending vertically upward along the inclined part of the hoof, the said base piece being provided at its lower end with one or more prongs inclined to the bearing face of the base piece in such manner as to penetrate the lower part of the shell of the hoof from a point on its upper surface downward and inward toward the base of the hoof, these prongs passing through substantially the same portion of the shell of the hoof as the usual fastening nails but entering the hoof in the opposite direction. The said pronged base-piece is provided near its upper part with a band straining device shown in this instance as a pivoted cam shaped lever which may be turned on its pivot to tighten or loosen the band and thereby fasten or unfasten the shoe.

Figure 1:
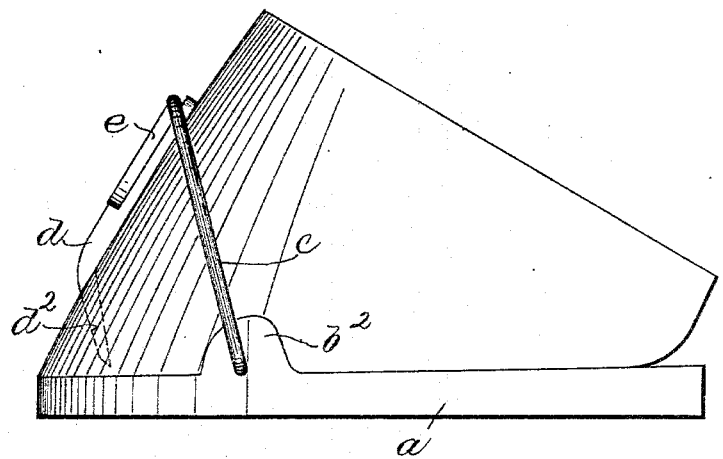
Figure 2:
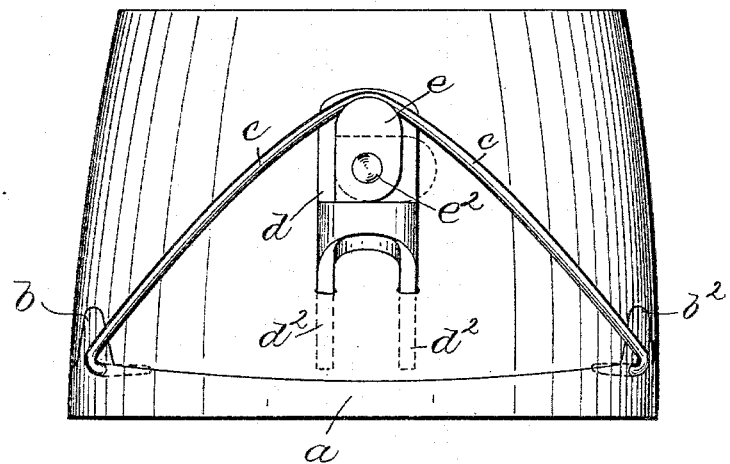

Figure 1 is a side elevation of a hoof provided with a shoe and fastening therefor, and Fig. 2 a front elevation thereof.

The shoe $a$ may be of usual construction except that it need have no nail-holes, and the said shoe is provided with lugs $b$, $b^2$, that engage with recesses in the edge of the hoof so as to properly position the shoe with relation to the hoof and prevent it from sliding thereon, said lugs being burned into the hoof in fitting the shoe thereto in the usual manner.

The fastening band or bail $c$ may be a piece of stout wire of proper length to pass in arch shape over the fore part of the hoof and has its ends properly shaped to engage with the shoe at the side of the hoof being preferably made with lateral offsets or fingers to enter perforations in the said lugs $b$, $b^2$, of the shoe, the said shoe and bail being substantially as shown and described in my former application aforesaid.

In order to strain the band tightly over the fore part of the hoof and to fasten the same securely thereto, a straining and supporting device is used which in accordance with the present invention consists of a base piece $d$ composed mainly of a flat plate that rests up and down on the inclined surface of the fore part of the hoof as shown, and is provided at its lower end with one or more (preferably two) prongs $d^2$ which extend into suitable perforations in the fore part of the shell of the hoof said prongs entering from the upper surface of the shell and extending toward the base of the shell. The inner face of the base piece is made concave or hollow transversely if necessary to fit the convexity of the hoof. These prongs thus securely fasten the base piece $d$ of the straining device to the hoof and support the same against downward movement along the inclined front surface of the hoof, although they may readily be withdrawn by moving the base piece upward. The said prongs penetrate only the portion of the shell of the hoof near the lower edge thereof which is usually penetrated by the nails commonly used for fastening shoes, and as they are introduced from this upper surface they are not liable to deviate from the proper direction in entering the hoof, and thereby injure the hoof, as sometimes happens in driving nails upward from the under surface of the hoof. The said base piece being thus securely supported against downward movement is provided with a straining device shown in this instance as a cam shaped arm or lever $e$ pivoted at $e^2$ on the said base piece in such manner that when in dotted line position Fig. 2, it receives the band $c$ loosely over it so that said band can be readily applied or removed and when turned to full line position it bears upon said band and draws it tightly upward thus straining the shoe up tightly against the tread surface of the hoof as clearly shown.

It is obvious that the construction of the straining device may be varied without departing from the essential characteristics of construction and operation of the device although the specific form shown in which the straining lever turns in the plane of the base-piece is believed to be the most desirable as it affords a secure fastening and does not have any objectionable projections from the surface of the hoof.

The base piece and straining device stand in substantially the same relation to the hoof as the toe weights that are used sometimes, and may be made of proper weight to afford an efficient toe weight if desired without impairing their functions as a means for securing the shoe to the hoof.

In my former application the straining device engaged with the hoof near the point where the fastening band passed over the hoof and was engaged with the hoof in the operation of tightening the band, and the spurs or projections used for engagement with the hoof are necessarily small and engage only with the surface portion of the hoof, as it would be impossible to use prongs that would actually penetrate or pass through the shell of the hoof in such position. In the present invention the straining device is securely connected with the hoof independently of the strain of the fastening wire, although the latter is applied in such manner as to prevent the disengagement or removal of the straining device while the fastening wire is under strain.

I claim.

1. The combination of the horseshoe provided with lugs or projections adapted to engage with the edge of the hoof, and the fastening band connected at its ends with the sides of the shoe and adapted to extend up over the fore part of the hoof; with the base piece $d$ adapted to rest upon the fore part of the hoof and provided at its lower end with prongs inclined to said base piece and adapted to penetrate the shell of the hoof from its upper surface toward the base, and the straining device connected with the upper portion of said base piece, substantially as and for the purpose described.

2. The combination of the horseshoe provided with lugs or projections adapted to engage with the edge of the hoof, and the fastening band connected at its ends with the sides of the shoe and adapted to extend up over the fore part of the hoof; with the base piece $d$ adapted to rest upon the fore part of the hoof and provided at its lower ends with prongs inclined to said base piece and adapted to penetrate the shell of the hoof from its upper surface toward the base, and the straining lever pivotally connected with the upper portion of said base piece and having its pivotal movement in the plane of the base piece, substantially as described.

In testimony whereof I have signed my name to this specification in the presence of two subscribing witnesses.

EDWARD T. COVELL.

Witnesses:
 FRANK M. SPARROW,
 A. EDWIN CLARKE.